United States Patent
Kubo et al.

(10) Patent No.: US 6,595,851 B1
(45) Date of Patent: Jul. 22, 2003

(54) GAME DEVICE, SYSTEM AND METHOD WHERE IDENTIFICATION DATA ASSIGNED TO INDIVIDUAL GAME DEVICES IS STOCHASTICALLY PROCESSED

(75) Inventors: Morikuni Kubo, Tokyo (JP); Tsutomu Watanabe, Tokyo (JP)

(73) Assignee: Konami Corporation, Tokyo (JP)

(*) Notice: Subject to any disclaimer, the term of this patent is extended or adjusted under 35 U.S.C. 154(b) by 342 days.

(21) Appl. No.: 09/627,141

(22) Filed: Jul. 24, 2000

(30) Foreign Application Priority Data

Jul. 23, 1999 (JP) .......................................... 11-209897

(51) Int. Cl.[7] .............................................. A63F 13/00
(52) U.S. Cl. ................................ 463/1; 463/29; 463/47
(58) Field of Search ................................. 463/1, 16–17, 463/22, 30, 42–44, 29, 36, 37, 40–47; 273/138.1, 139, 459, 460–461, 292, 308

(56) References Cited

U.S. PATENT DOCUMENTS

| | | | | |
|---|---|---|---|---|
| 5,201,525 A | * | 4/1993 | Castro ......................... | 273/293 |
| 5,411,259 A | * | 5/1995 | Pearson et al. ............... | 463/36 |
| 5,662,332 A | * | 9/1997 | Garfield ....................... | 273/308 |
| 5,795,228 A |   | 8/1998 | Trumbull et al. |   |
| 6,200,216 B1 | * | 3/2001 | Peppel ......................... | 463/1 |
| 6,251,010 B1 | * | 6/2001 | Tajiri et al. .................. | 463/1 |
| 6,254,477 B1 | * | 7/2001 | Sasaki et al. ................. | 463/1 |
| 6,267,677 B1 | * | 7/2001 | Tajiri et al. .................. | 463/1 |
| 6,267,678 B1 | * | 7/2001 | Kubo et al. ................... | 463/11 |
| 6,375,566 B1 | * | 4/2002 | Yamada ........................ | 273/308 |
| 6,398,651 B1 | * | 6/2002 | Yamada ........................ | 463/1 |

FOREIGN PATENT DOCUMENTS

| | | |
|---|---|---|
| JP | 2000-157744 | 6/2000 |
| WO | WO/9962606 | 12/1999 |

OTHER PUBLICATIONS

Craig Harris "Pocketstation" IGN/PSX, Mar. 10, 19999 (pp. 1–3), XP002130988.

* cited by examiner

*Primary Examiner*—Valencia Martin-Wallace
*Assistant Examiner*—Scott E. Jones
(74) *Attorney, Agent, or Firm*—Sughrue Mion, PLLC

(57) ABSTRACT

In a game system having inherent identification data assigned to each of memory card devices, novel cards can be generated by comparing the inherent identification data with a password given as an input signal. Thus, the inherent identification data can have functions other than a product identification function. Specifically, when a predetermined correlation is obtained as a result of this comparison between the inherent identification data and the password, a specific card determined by the correlation is generated as the novel card in a lottery style. The specific card can be used in a card game implemented by a game device main unit.

25 Claims, 9 Drawing Sheets

(b)

GAME DEVICE, SYSTEM AND METHOD WHERE IDENTIFICATION DATA ASSIGNED TO INDIVIDUAL GAME DEVICES IS STOCHASTICALLY PROCESSED

BACKGROUND OF THE INVENTION

1. Field of the Invention

The present invention relates to a game device and, more particularly, to a game device individually assigned with a particular identification number, to a game system including such game device, and to an image display method used therein. This invention also relates to a computer-readable storage medium storing a program used in a game device and a game system.

2. Description of the Related Art

In recent years, many video game devices of various types for commercial and domestic use have been developed and sold. Home video game devices include non-portable game devices for playing games using a home television apparatus, and portable game devices for playing games apart from a home television apparatus, and these non-portable and portable game devices are widely used by an enormous number of users. Moreover, a large number of game software applications for such game devices have been devised and marketed.

Under the circumstances, the present applicants, and others, have previously proposed a portable game device and a storage medium for playing a card game (see Japanese Unexamined Patent Publication (JP-A) No. 2000-157744). In this card game, many different types of cards, each having a different capability index and a different function, are selected by the player, and these cards appear at a prescribed playing area defined on the screen of a portable game device and are compared with cards laid by an opponent (the opponent may be a computer in the game device). The victory in the game is determined on the relative strengths of the cards. In this card game, various means are adopted to engage the player's interest in the card game.

However, in order to retain the player's interest and to entertain a greater number of users, it is necessary to make the card game more interesting. Moreover, it will be understood that, if the player's interest is attracted to other factors than the card game itself, the demand for the card game will increase further.

In some of the game devices of the type described, an identification code (for example, an identification number,) as identification data is assigned to each individual device to identify the individual game device. This identification data is intended to be used in product management. Actually, portable game devices assigned with individual identification data are already available on the market. Furthermore, such identification data is often assigned to various electronic products, such as the central processing unit of a computer, or the like. In any event, the identification data assigned by a manufacturer to the game device for the purpose of product management is determined without any regard to the game program or the application program to be executed in the game device.

Under the circumstances described above, consideration has currently been directed only to the idea of using the identification numbers assigned to game devices in order to individually identify the game devices or the electronic products. However, no consideration is made at all about using identification data for any purpose other than product management. More particularly, in the previously submitted application, there was no idea of using identification data to enhance the interest generated by the card game.

SUMMARY OF THE INVENTION

It is an object of the present invention to provide a game device which increases the interest generated by a game, by utilizing a game device to which identification data has been assigned and by relating said identification data to the game.

It is a further object of the present invention to provide a game device which utilizes identification data and which is applied to a card game and is able to make a card game more interesting.

It is a yet further object of the present invention to provide a computer-readable storage medium storing a program whereby the aforementioned identification data can be accessed and new functions can be appended to this identification data.

It is a yet further object of the present invention to provide a game system capable of directing the player's or user's interest in factors other than a game itself.

It is a further object of the present invention to provide an image display method for displaying images which cannot be displayed by a game device main unit alone, by utilizing identification data.

It is a more general object of the present invention to provide an electronic processing device in which functions other than a product identification function are assigned to identification data.

According to one aspect of this invention, there is provided a game device for implementing a game in accordance with a predetermined program, the game device being provided with input means for inputting input signals while inherent identification data is assigned to each individual game device, the game device comprising identification data storage means for storing the inherent identification data; and input signal processing means, responsive to a specific input signal given from the input means, for generating at least one of an event and an item determined by a relationship between the input signal and the inherent identification data by the use of the inherent identification data. With this structure, in case where the game device is for a card game, a specific card determined by the input signal and the identification data can be generated as the aforementioned items. Thus, the game device including the specific card unique to the game device can be implemented.

The input signal processing means comprises judging means, responsive to said input signal, for judging whether or not the relationship between the input signal and the identification data has a predetermined relationship after the inherent identification data is read out of the identification data storage means; and generating means for generating the at least one of an event and an item, when the relationship between the input signal and the identification data has the predetermined relationship.

The judging means may comprise comparing and detecting means for comparing the input signal with the identification data to detect a match or a non-match therebetween as the predetermined relationship, and means for driving the generating means on detection of the match.

The judging means may comprise converting means for carrying out conversion of at least one of said input signal and said identification data. If the input signal or the converted signal and the identification data or the converted data respectively represent numbers consisting of a plurality of digits, the match between the two numbers is detected sequentially from a numeral at the lowest digit to obtain the number of matching digits. The specific card is generated in dependence upon the number of the matching digits. It is thus possible to determine the specific card to be obtained in a lottery manner and to lead the player's interest to collection of the cards.

According to another aspect of this invention, there is provided a game system comprising a game device main unit for executing a game in accordance with a predetermined program, when a storage medium storing a predetermined program is mounted onto the game device main unit, and a memory card device for carrying out communication with the game device main unit, each memory card device being assigned with an inherent identification code which differs from that of any other memory card device, as identification data, wherein the memory card device comprises a program memory for storing a program section which forms a part of the predetermined program and which is accessible to the inherent identification data; password input means for inputting a password as an input signal to the memory card device; and detecting means for detecting the relationship between the input signal and the inherent identification data, under the control of the program section, to reflect the results of the detection step in the game which is being executed by the game device main unit. In case where the game system is for a card game similar to that described in Japanese Unexamined Patent Publication No. 2000-157744, it is possible to generate a specific card which is unique to the memory card device and which cannot be generated by the game device main unit alone. Thus, the interest of a player can be directed not only to the card game itself but also to the act of collecting cards.

According to still another aspect of this invention, there is provided a computer-readable storage medium which stores a card game program and which is for use in a game device comprising input means for inputting input signals and means for storing inherent identification data, wherein the program comprises the steps of detecting that a specific input signal is input from the input means; and generating specific cards determined by the relationship between the input signal and the inherent identification data. In this manner, the cards, which can not be obtained in a normal game, are generated by the use of the identification data to achieve a lottery-like effect.

According to yet another aspect of this invention, there is provided an electronic processing device for use in executing electronic processing according to a program, the electronic processing device having inherent identification data assigned individually to each such electronic processing device, wherein the inherent identification data is accessed by the program in response to an input signal and a relationship between the input signal and the inherent identification data is used to generate, in a lottery style, events peculiar to the electronic processing device and to produce an item dependent on the inherent identification data on a probability basis.

According to a further aspect of this invention, there is provided an image display method used in a system comprising a main device having a display device for displaying images, input means for inputting input signals, display means for displaying the input signals, and a subsidiary device capable of communicating with the main device, the subsidiary device having inherent identification data assigned individually thereto, wherein the subsidiary device performs a step of comparing the input signal with the identification data, and a step of instructing that a prescribed image corresponding to the results of the comparison displayed by the display means; and the main device implementing a step of displaying the particular image on the display device of the main device in accordance with the instruction from the subsidiary device, so as to display the prescribed image which cannot be displayed by means of the main device alone.

DESCRIPTION OF THE PREFERRED EMBODIMENTS

Firstly, in order to facilitate understanding of the present invention, description will be given of a game device to which the present invention is applicable.

Figure 1:
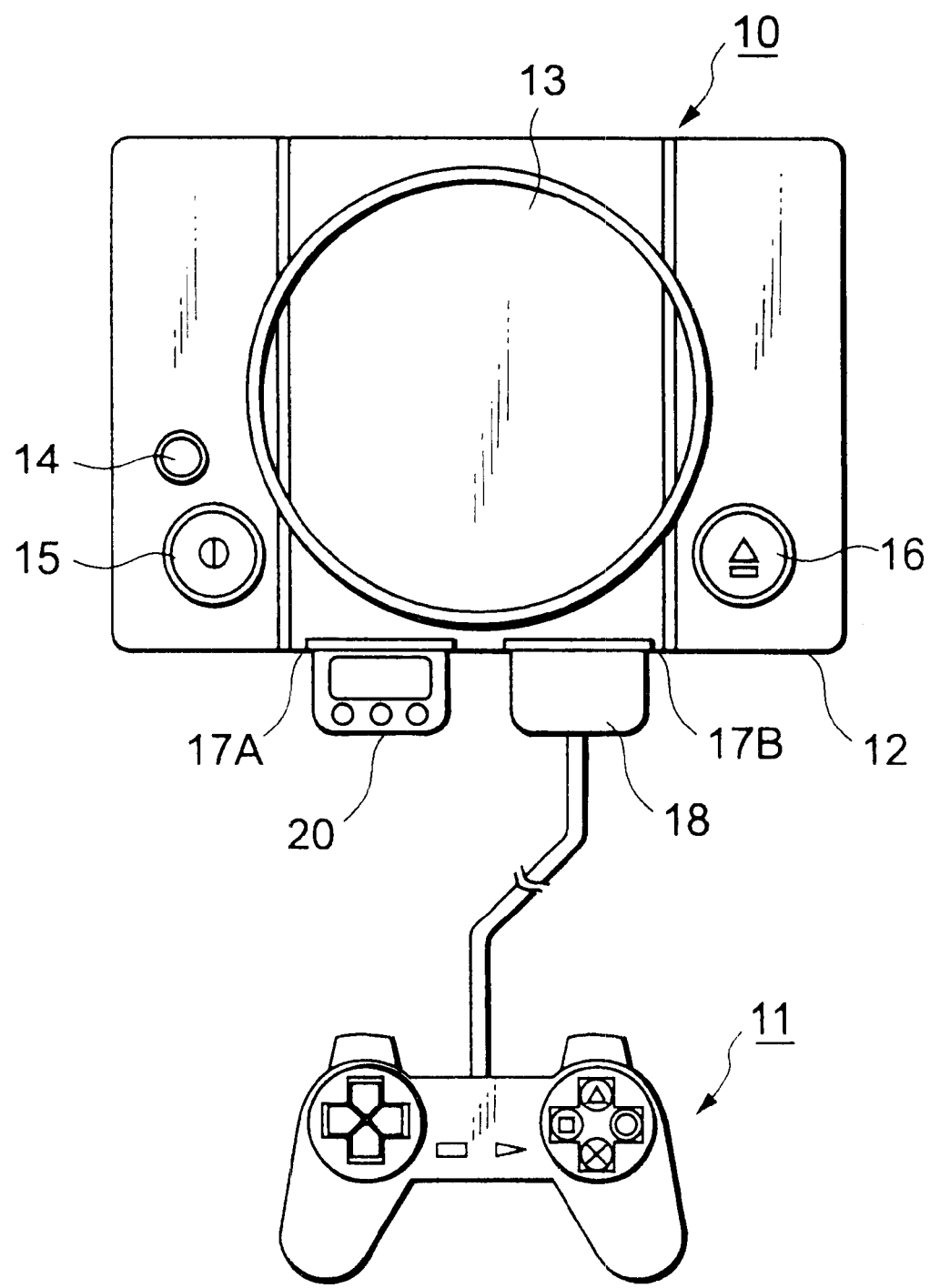
FIG. 1 is a plan view for describing the general structure of a game system to which the present invention can be applied.

Referring to FIG. 1, a home video game device to which the present invention is applicable comprises a game device main unit 10 (hereinafter, called simply 'main unit'), and a controller 11. Upon playing a typical game, the main unit 10 is connected to a television unit (not illustrated). A player can enjoy a video game by operating the controller 11 whilst watching the screen of the television unit.

More specifically, the main unit 10 comprises a generally square-shaped housing 12, and an openable/closable disk mounting section 13 provided at the center of the upper face of the housing. In the home video game device illustrated in the figure, an optical disk (not shown) is mounted in the disk mounting section 13 as a storage medium. The optical disk comprises a CD-ROM which stores an application program for the video game.

Furthermore, the housing 12 forming the main unit 10 has an upper face provided with a reset switch 14 for resetting the video game when operated by the player, a power switch 15, and a disk operation switch 16. By operating the disk operation switch 16, the disk mounting section 13 is opened and closed so as to mount or remove the optical disk.

The housing 12 has a front side face provided with two slots 17A and 17B to receive memory cards or the like inserted therein. Each of the slots 17A and 17B is divided into two sections, i.e., upper and lower sections. The controller 11 can be connected to the lower section of each of the slots 17A and 17B whilst the memory card can be connected to the upper section of each of the slots 17A and 17B.

In the example being illustrated, the controller 11 is connected to the main unit 10 through its connection terminal 18 received in the lower section of the slot 17B. On the other hand, a memory card device 20, to which the present invention is applicable, is inserted in the upper section of the slot 17A.

The memory card device 20 is assigned with identification data, such as an identification number, specific thereto and different from that assigned to other memory card devices. The memory card device 20 is used to store data from the main unit 10 and may be used as a portable game device, as will later be described. As is obvious from the above, the identification data is different from device to device. Typically, the identification data is used by manufacturers for the purpose of product management.

Figure 2A:
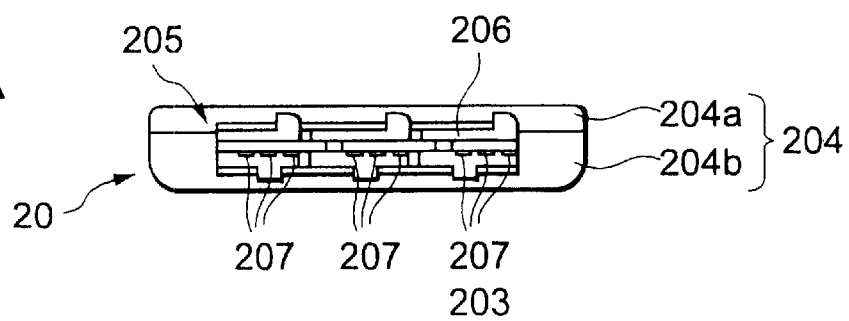
FIGS. 2A, 2B, and 2C are an upper side view, a plan view and a lower side view of a memory card device for implementing a card game relating to the present invention, respectively.
Figure 2B:
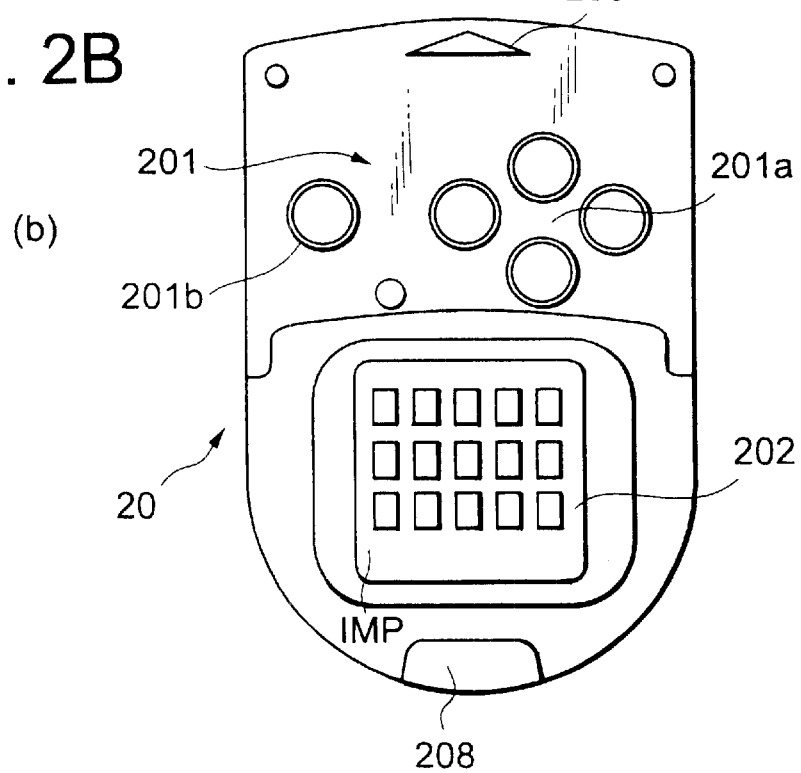
Figure 2C:
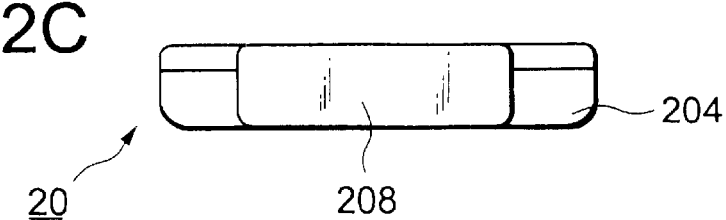

Referring to FIGS. 2A–2C in addition, the memory card device 20 shown in FIG. 1 will be described in further detail. The memory card device 20 illustrated in FIGS. 2A–2C has an upper face shown in FIG. 2B, a main unit installation side face shown in FIG. 2A, and an opposite side face shown in FIG. 2C and opposite to the main unit installation side face. As illustrated in FIG. 2B, the upper face of the memory card device 20 has an input button 201, a liquid crystal display (LCD) 202 forming a display screen, and an arrow mark 203 indicating the direction of insertion into the slots 17 (suffixes omitted). In the example being illustrated, the button switch 201 comprises up/down/left/right buttons 201a and an enter button 201b for entering and defining events, figures, and the like.

As seen from FIG. 2A, the memory card device 20 also has a package 204 comprising an upper shell 204a and a lower shell 204b. The package 204 is provided with a connector window 205 formed on the side face of the package 204. The package 204 contains a circuit board 206 with memory elements, a microcomputer, and the like mounted thereon, and is provided with power and signal connection terminals 207. As shown in FIG. 2C, the opposite side face opposite to the main unit installation side face is provided with a wireless communication means 208 for transmission of infrared rays to communicate with other memory card devices by means of infrared rays.

Figure 3:
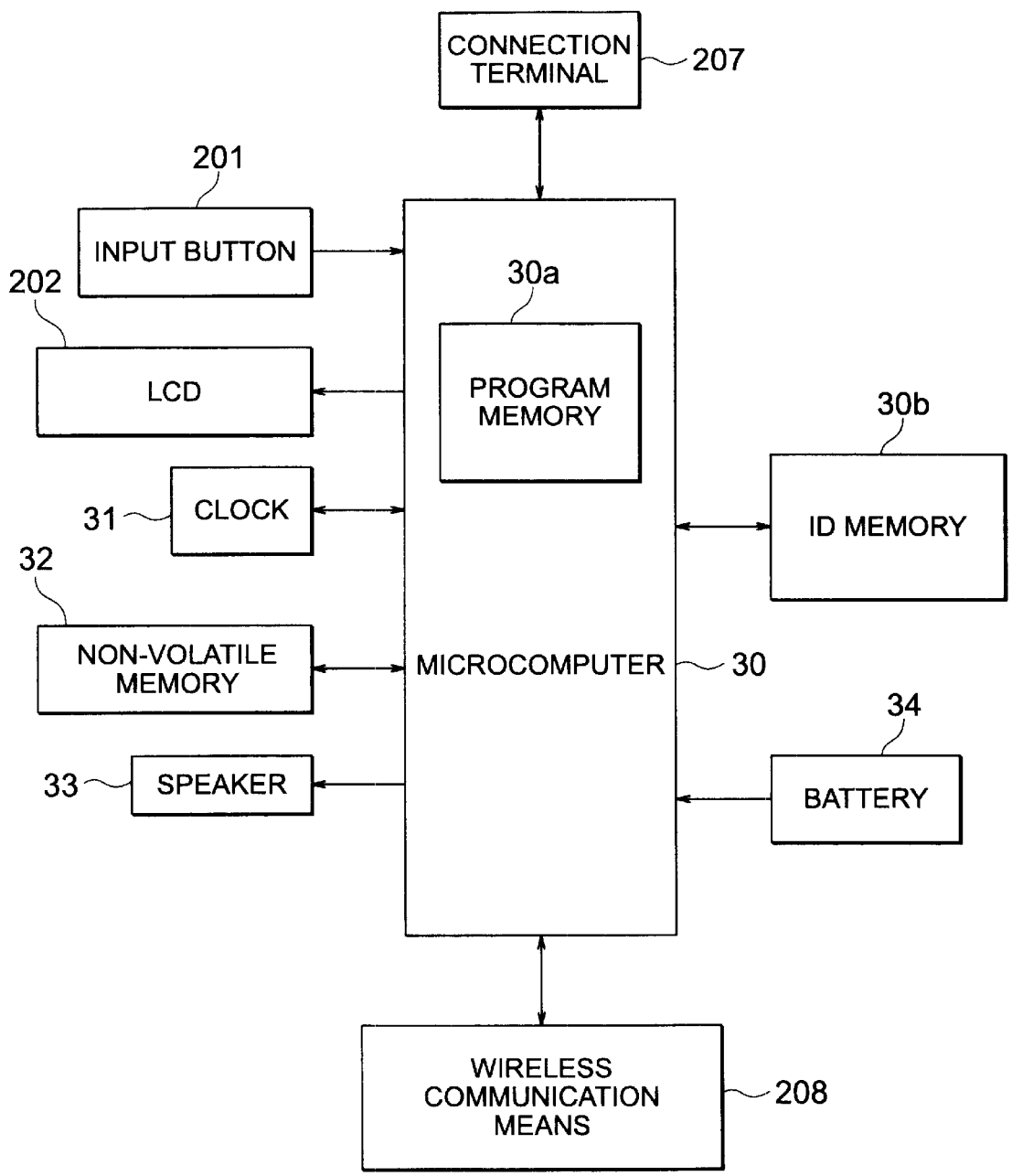
FIG. 3 is a block diagram of the memory card device illustrated in FIG. 2.

Referring to FIG. 3, the internal structure of the memory card device 20 shown in FIGS. 2A–2C will be described.

The memory card device 20 being illustrated comprises a microcomputer 30 forming a control section. The microcomputer 30 is provided with a program memory 30a equipped therein. The microcomputer 30 is connected to the input button 201, the LCD 202, the connection terminals 207, and the wireless communication means 208 illustrated in FIGS. 2A–2C. Furthermore, the microcomputer 30 is connected to a clock 31, a non-volatile memory 32, a speaker 33, and a battery 34. The non-volatile memory 32 comprises a semiconductor memory, such as a flash memory, which retains the data stored therein in absence of the power supply. Moreover, since the memory card device 20 itself has the battery 34 as described above, it is possible to use a static random access memory (SRAM) as the non-volatile memory 32.

The memory card device 20 of the present invention is provided with the program memory 30a as described above. Therefore, by downloading the application program from the main unit 10 into the program memory 30a, it is possible to change or execute the application program in the memory card device 20 itself. Thus, the memory card device 20 with the application program downloaded therein can be removed from the main unit 10 and used as an independent portable game device.

In correspondence with apparatuses connected to the memory card device 20, the microcomputer in the memory card device 20 in the present invention is provided with a main unit connection interface, a memory interface, a display interface, an input interface, a sound interface, a wireless communication interface, a program download interface, a clock management system, and the like.

The memory card device 20 is preliminarily assigned with identification data. The identification data is stored in an ID memory 30b connected to the microcomputer 30.

It is noted here that the ID memory 30b not only stores the specific identification data assigned to the memory card device 20 but also has a list storage region for storing passwords (which will later be described) in the form of a list.

Next referring to FIG. 4, description will be made of the internal structure of the game device main unit 10 to which the memory card device 20 of the present invention is mounted.

Upon playing a game, an optical disk (disk-shaped storage medium, such as a CD-ROM) is mounted in the game device main unit 10 as a storage medium 84 storing a program for execution of the game. In this embodiment, it is supposed that the optical disk stores a computer-readable program for execution of a card game.

Figure 4:
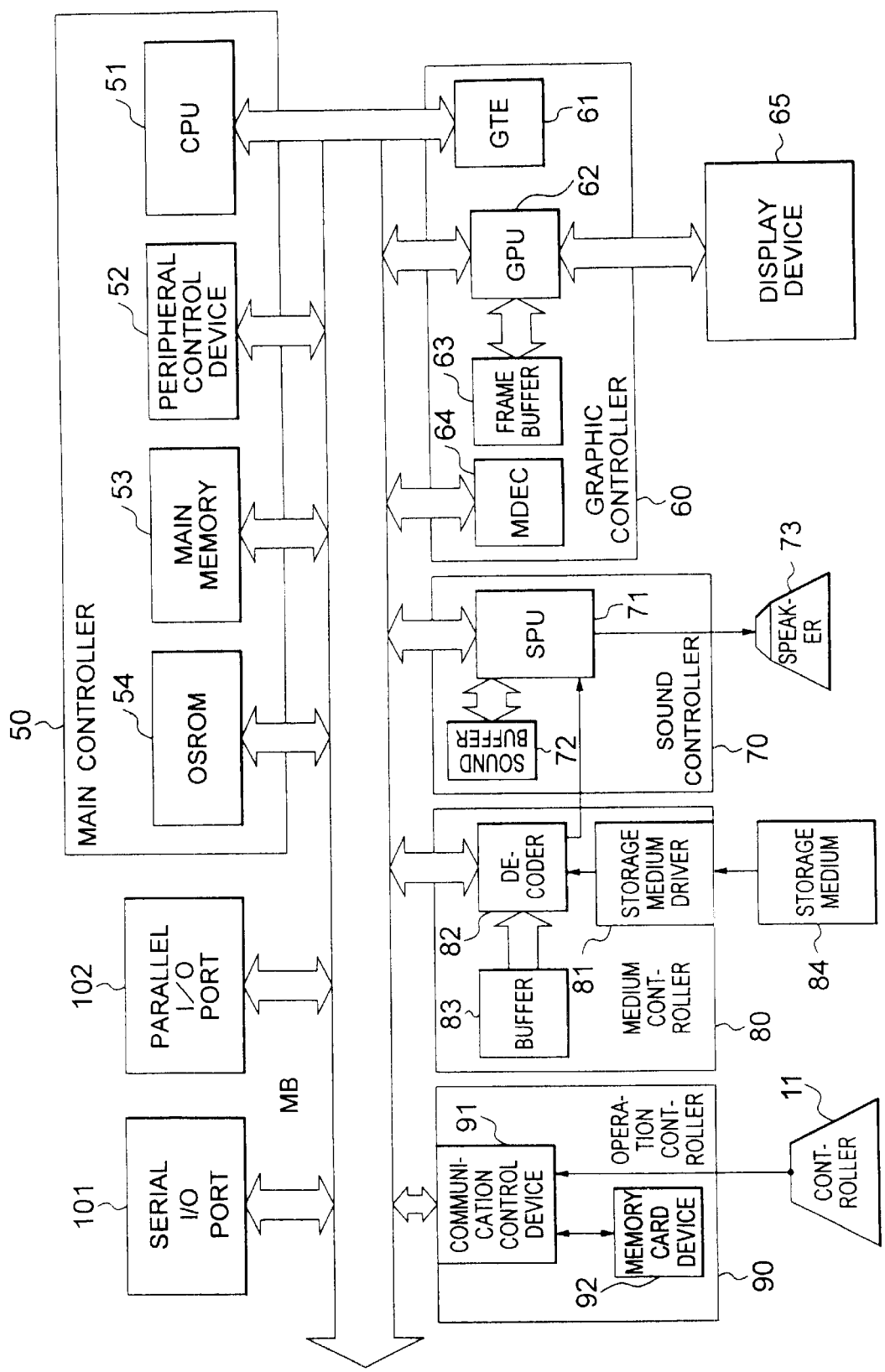
FIG. 4 is a block diagram of a game device main unit used in the game system illustrated in FIG. 1.

More specifically, as illustrated in FIG. 4, the game device according to the present invention comprises a main controller 50, a graphics controller 60, a sound controller 70, a medium controller 80, and an operation controller 90. These controllers 50–90 may collectively be called a control unit. The illustrated control unit, namely, the controllers 50–90 are all connected to a main bus MB. To the main bus MB, a parallel I/O port 101 for communication with other game devices are connected. Moreover, a combination of the main controller 50, the operation controller 90, and the medium controller 80 serves as a game control section for controlling the execution of the game in response to the operation of the player via the controller 11 which serves as an operation input section.

The main controller 50 comprises a central processing unit (CPU) 51, a peripheral device controller 52, a main memory 53, and an operating system (OS) ROM 54. More specifically, the peripheral device controller 52 in the main controller 50 executes interruption control, time control, memory control, direct memory access (DMA) transfer control, and the like. On the other hand, the main memory 53 is implemented, for example, by a RAM having a memory capacity of two megabytes. The OSROM 54 is implemented, for example, by an ROM having a memory capacity of 512 kilobytes and stores a software program, such as an operating system, for controlling the main memory 53, the graphics controller 60, the sound controller 70, and the like.

The CPU 51 illustrated in the figure may be a 32-bit RISC (Reduced Instruction Set Computer) CPU and controls the remaining elements in accordance with the operating system stored in the OSROM 54. The CPU 51 is equipped with an instruction cache and a scratch pad memory, and also carries out management of a real memory.

The graphics controller 60 comprises a geometry transfer engine (GTE) 61, a graphic processing unit (GPU) 62, a frame buffer 63, and an expander (which may be called a motion decoder (MDEC) as will become clear later) 64. The GPU 62 of the graphics controller 60 is connected to a display device 65 which serves as a display control section for controlling the display of a game scene in the display device 65.

In case of a typical home video game device, the display device 65 is a television monitor. In case of a personal computer or a workstation, the display device 65 is a computer display. In case of a commercial game machine, the display device 65 is a game display device.

In the above-mentioned graphic controller 60, the geometry transfer engine (GTE) 61 is implemented by a co-processor for processing a coordinate conversion or the like while the graphics processing unit (GPU) 62 draws a picture in response to a drawing instruction from the CPU 51. Such a picture drawn by the GPU 62 is stored as a picture image in the frame buffer 63 of, for example, 1 megabyte. Moreover, the expander 64 performs orthogonal transform, such as discrete cosine transform, and decodes a compressed and encoded image data signal into a motion picture. In this connection, the expander 64 may be referred to as the MDEC, as mentioned before.

The geometry transfer engine (GTE) 61 has a parallel computing circuit for executing a plurality of calculations in parallel. Specifically, the GTE 61 works as a co-processor for the CPU 51 to perform coordinate conversion, such as perspective conversion, and light source calculation by calculating an inner product of a normal vector and a light source vector in response to a calculation request from the CPU 51. For example, fixed point calculation for a matrix and a vector can be carried out at a high speed.

More specifically, the GTE 61 can carry out coordinate calculation for 1,500,000 polygons per second when a triangle polygon is subjected to flat shading such that the single triangle polygon is painted in the same color. Thus, in this image processing system, it is possible to reduce a load imposed upon the CPU 51 and to perform high-speed coordinate calculation. Herein, the term "polygon" means a smallest graphic unit to form a three-dimensional object to be displayed and has a polygonal shape, such as a triangular or a rectangular shape. In the present invention, coordinate calculation for each polygon is carried out by the use of the GTE 61, as will later be described.

The graphics processing unit (GPU) 62 is operable in response to a polygon drawing instruction from the CPU 51 to draw the polygon into the frame buffer 63. The GPU 62 can draw approximately 360,000 polygons per second at maximum. The GPU 62 has a two-dimensional address space, independent of the CPU 51, for mapping the content of the frame buffer 63.

The frame buffer 63 is implemented by a dual-port RAM and can simultaneously execute the drawing operation from the GPU 62 or transfer from the main memory 53 and readout operation for the display. More specifically, the frame buffer 63 has a memory capacity of, for example, 1 megabyte and may be treated as a matrix of 16-bit pixels, 1024 in a horizontal direction and 512 in a vertical direction.

The frame buffer 63 has an image display zone stored therein and is able to output a desired part of the display zone, for example, to the display device 65. In addition to the display zone outputted as a video output, the frame buffer 63 has a CLUT area and a texture area. The CLUT area serves to store a color lookup table (CLUT) to be accessed by the GPU 62 upon drawing the polygon. The texture area serves to store materials or textures to be inserted (mapped) into the polygon drawn by the GPU 62 after coordinate conversion.

The frame buffer 63 illustrated in the figure can perform high-speed DMA transfer to and from the main memory 53.

On the other hand, the expander (MDEC) 64 of the graphics controller 60 is operable under control of the CPU 51 to read an image data of a still image or a moving image out of the main memory 53 and to decode the image data into decoded image data which is stored in the main memory 53 again. The image data is preliminarily read from the recording medium 84 and stored in the memory 53. Specifically, the MDEC 64 can execute inverse discrete cosine transform (inverse DCT) at a high speed and can expand compressed data which is compressed according to the color still image compression standard (JPEG—Joint Picture Experts Group) or the cumulative media moving image encoding standard (MPEG—Motion Picture Experts Group) and which is read out from the storage medium 84.

The image data reproduced as mentioned above is sent through the GPU 62 to the frame buffer 63 to be stored therein and can be used as a background image of the image drawn by the GPU 62.

The sound controller 70 comprises a sound processing unit (SPU) 71 for generating a musical sound, an imitation effects sound, and the like, in response to the instructions sent from the CPU 51, a sound buffer 72 of, for example, 512 kilobytes for storing sound data (voice, music) read out of the CD-ROM and sound source data, and a speaker 73 serving as sound output means for outputting the musical sound, the imitation effects sound, and the like generated by the SPU 71.

The SPU 71 has an ADPCM decoding function of reproducing audio data which is subjected to adaptive differential encoding (ADPCM) and which is specified by a differential code of four bits obtained by differentially encoding audio data of sixteen bits, a reproducing function of generating the imitation effects sound by reproducing the sound source data stored in the sound buffer 72, a modulating function of modulating and reproducing the audio data stored in the sound buffer 72. Specifically, the SPU 71 contains 24 ADPCM sound sources having functions of looping and automatically changing an operating parameter using a time as a coefficient, and is operable under control of the CPU 51. Moreover, the SPU 71 administrates the independent address space to which the content of the sound buffer 72 is mapped. The SPU 71 reproduces data by transferring ADPCM data from the CPU 51 to the sound buffer 72 and by directly transferring key-on/key-off information and modulation information.

The sound controller 70, which may also be called a sound system, has the above-mentioned functions and can be used as a sampling sound source responsive to the instruction from the CPU 51 for generating the musical sound, the imitation effects sound, and the like, on the basis of the audio data stored in the sound buffer 72.

The medium controller 80 comprises a storage medium driver 81, decoder 82, and buffer 83. The storage medium 84 is loaded into the storage medium driver 81. The storage medium 84 may be a CD-ROM, a hard disk, an optical disk, a flexible disk, and a semiconductor memory. In the illustrated example, the CD-ROM is used as the storage medium 84 as described in the foregoing. In this connection, the storage medium driver 81 is a CD-ROM driver and the decoder 82 is a CD-ROM decoder. An application program of the image display method according to the present invention is stored in the storage medium 84.

The storage medium driver 81 described above has a function of reproducing programs, data, and the like stored in the storage medium 84, namely, the CD-ROM disk. The decoder 82 has a function of decoding the programs, data, and the like which are stored with an error correction code (ECC) added thereto. The buffer 83 is implemented by a RAM having a storage capacity of, for example, 32 kilobytes, for temporarily storing reproduced data from the storage medium driver 81.

Herein, it is possible to support the data format such as CD-DA, CD-ROM XA, or the like. The decoder 82 also reproduces the audio data stored on the storage medium 84 and therefore serves as a part of the sound controller 70.

The audio data stored in the storage medium 84 and reproduced by the storage medium driver 81 may be, for example, the ADPCM data (ADPCM data in format of CD-ROM XA) mentioned above or PCM data obtained by analog-to-digital conversion of the audio signal.

In the audio data mentioned above, the ADPCM data is stored, for example, as differential signals of four bits obtained from the digital data of 16 bits. The ADPCM data is subjected to error correction and decoding in the decoder 82, supplied to the SPU 71 to be subjected to digital-to-analogue conversion, and is transmitted to the speaker 73.

On the other hand, when the audio data comprises the PCM data stored as the digital data of sixteen bits, the audio data is decoded by the decoder 82 into decoded data which is then used to drive the speaker 73. The audio output of the decoder 82 is supplied to the SPU 71 to be mixed with the output of the SPU 71 and then passes through a reverb unit to produce a final audio output.

The operation controller 90 provided in the game device illustrated in FIG. 1 comprises a communication control device 91 and an auxiliary memory (herein, the memory card device) 20. The communication control device 91 serves to control communication with the CPU 51 via the main bus MB. The communication control device 91 is connected to a controller 11 for inputting an instruction from the user, i.e., a player. The memory card device 20 serves to store the instruction supplied from the controller 11 and setting of the game, and has the various functions described in conjunction with FIG. 3.

The controller 11 serves as an interface for transmitting the user's intention to the application program. In order to input the user's instruction, the controller 11 comprises, for example, 16 operation keys. In response to the request from the communication control device 91, the states of these instruction keys are transmitted to the communication control device 91 approximately 60 times per second by the use of synchronous communication. The communication control device 91 transmits the states of the operation keys of the controller 11 to the CPU 51. As described above, the main unit 10 is provided with two connectors. It is therefore possible to connect two controllers 11 to the main unit 10. If a multi-tap is used, it is possible to connect a number of controllers to the main unit 10.

In the above-mentioned manner, the user's instruction is supplied to the CPU 51. Then, the CPU 51 performs processing according to the user's instruction under control of the game program being executed.

If it is required to store the setting for the game being executed or a score of the game at the end of the game or in the middle of the game, then the CPU 51 delivers to the communication control device 91 those data to be stored. The communications control device 91 then makes the memory card device 20 store the data from the CPU 51. Since the memory card device 20 is separated from the main bus MB, the memory card device 20 can be loaded and unloaded while the power supply is turned on. Therefore, the setting of the game can be stored in a plurality of memory card devices 20.

Among the main memory 53, the GPU 62, the MDEC 64, and the decoder 82, a large volume of image data must be transferred at a high speed upon carrying out reading of the program, displaying or drawing of the image, and so on.

For this purpose, DMA transfer can be carried out in the image processing system to directly transfer data among the main memory 53, the GPU 62, the expander (MDEC) 64, and the decoder 82 under control of the peripheral device controller 52. Thus, such DMA transfer is carried without using the CPU 51, it is possible to reduce the load on the CPU 51 imposed by the data transfer and to achieve high-speed data transfer.

Figure 5:
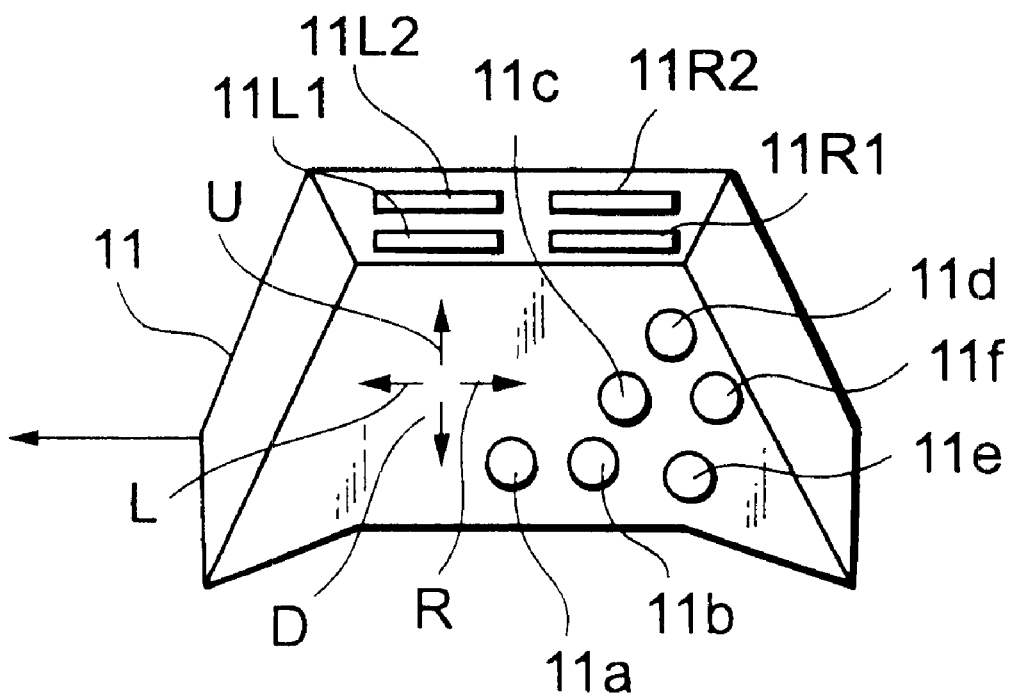
FIG. 5 is a schematic view for describing of a controller used in the game system illustrated in FIG. 1.

Next referring to FIG. 5, description will be made more in detail about the controller 11 used in the game device of the present invention. In order to input the instruction from the player, the controller 11 has various kinds of keys which will presently be described.

Now, the operation keys of the controller 11 will be described. The controller 11 has an upper surface provided with a cross key comprising a left key L, a right key R, an up key U, and a down key D, a start button 11a, a select button 11b, and first to fourth buttons 11c, 11d, 11e, and 11f. The controller 11 has a front surface provided with first and second left buttons 11L1 and 11L2, and first and second right buttons 11R1 and 11R2. The first and the second left buttons 11L1 and 11L2 and the first and the second right buttons 11R1 and 11R2 are assigned with various functions, such as cursor movement units.

Among the above-mentioned keys, the cross key is used for the player to supply the CPU 51 with the instruction requesting upward, downward, leftward, or rightward movement of a character as an object to be moved. When the start button 11a is operated by the player, the CPU 51 is instructed to start operation in accordance with the game program read from the storage medium 84 and loaded into the main memory 53. The select button 11b serves to inform the CPU 51 of various selections relating to the game program loaded from the storage medium 84 into the main memory 53.

If it is required to store the setting for the game being executed or the result at the end of the game or in the middle of the game, the CPU 51 transmits to the communication control device 91 the data to be stored. The communication control device 91 is operable to make a memory card similar to the memory card device 20 store the data from the CPU 51, to transmit the data stored in the memory card device 20 to the CPU 51, and to change the name of the data. Since the memory card device 20 and the memory card are separated from the main bus MB as mentioned above, the memory card device 20 and the memory card can be loaded and unloaded while the power supply is turned on. Therefore, it is possible with this structure to store the setting of the game into a plurality of memory cards.

In one embodiment of the present invention, the card game being executed is similar to the card game described in Japanese Unexamined Patent Publication (JP-A) No. 2000-157744. However, in order to help understanding of the present invention, the card game according to the present invention will briefly be described.

In the card game according to one embodiment of the present invention, players alternately place or locate cards to a playing area defined on the screen of the display device 65, such as a home television device. Herein, a plurality of players may play the game using a plurality of controllers 11 connected to the main unit 10. Alternatively, a single player may play the game with the computer.

For use in the card game, 700 types of cards are prepared. Among the 700 types of cards, a limited number of cards are used to play a game. Specifically, the players lay these cards in the playing area on the screen and specify attack or defense for each laid card until the life point of either one of the players reaches zero. The losing player whose life point has reached zero in the card game should give one card to the winning player.

Generally, the above-mentioned cards are categorized into monster cards having predetermined attack points and defense points, respectively, magic cards exhibiting prescribed specific effects when laid on the playing area, and competition environment cards representing competition environments such as mountain, sea, forest, wilderness, grassland, and darkness. The above-mentioned competition environment cards represent the terrain of the field where the competition, i.e, combat or fight, is to be executed, and may be called 'terrain cards'. The monster cards include a number of cards having attack capability and/or defense capability depending upon the terrain fields. Therefore, the strength of each card is not uniquely determined so that the outcome of the game, win or lose, is difficult to predict. This prevents the player's interest in the game from being exhausted.

Moreover, the monster cards may be classified into a plurality of groups assigned with different degrees of superiority so as to improve the interest in the game.

Among the above-mentioned cards, the magic cards have predetermined effects upon the cards laid on the playing area, and cause prescribed effects upon the monster cards laid on the playing area. For example, when a magic card called 'black hole' is laid, the cards already laid in the playing area on the screen are erased from the screen. Moreover, the magic cards also include a strengthening card which is combined with a monster card to strengthen the monster card, and a trap card which automatically exhibits its effect when the attack launched by the opponent satisfies a particular condition.

By preparing a variety of magic cards as described above, the card game is thrilling and exciting. If each player is permitted to lay a plurality of cards to the playing area at each turn, the effect of a preceding card can be utilized. This makes the card game more strategic and tricky.

In the above-mentioned card game, preparation is made of a variety of cards each of which has a defense point and an attack point. However, as stated above, each player can not freely use all of the 700 types of cards in the game. In the present invention, particular cards among the 700 types of cards can be obtained only when prescribed conditions are satisfied. In this manner, each player will have a much interest in some questions as to whether or not the prescribed conditions are satisfied, which cards can be obtained, and the like. This prolongs the player's interest in the card game and leads the player's interest to the collection of the cards.

In the present invention, a particular code, such as a number, is supplied as an input signal from an external source. Provided that the relationship between the particular code represented by the input signal and the identification data individually assigned to the memory card device 20 satisfies a predetermined relationship, specific cards can be obtained. In the present invention, preparation is made of a plurality of types of cards, for examples, 80 types of cards, as the specific cards obtained in the above-mentioned manner.

In order to help understanding of the present invention, summarized description will be given of the game according to this embodiment. In this game, the memory card device 20 assigned with individual identification data is used as the game device so that those cards which do not normally appear on the game screen, i.e. the specific cards which are not normally be obtained can be acquired as described above. It is assumed here that the memory card device 20 is allocated with an identification number represented by a decimal number as the identification data and that the identification number is difficult for the player himself or herself to know. In this example, the identification number is stored in the ID memory 30b illustrated in FIG. 3.

On the other hand, it is supposed that at least one number (herein called 'password') expressed by a 15-digit decimal number is disclosed in magazines or the like, together with the information of the specific card which can be acquired by entering the password into the memory card device 20. Since the player can not know the identification number of the memory card device 20 in a normal approach, it is uncertain, before the player enters the password into the memory card device 20, whether or not any specific card is obtained or which specific card is obtained.

More specifically, in one embodiment of the present invention, comparison is made between lower five digits of the disclosed password and lower five digits of the identification number of the memory card device 20, respectively, to detect a match therebetween. The player acquires the specific card depending upon the degree of matching, i.e., the number of digits for which the match is detected.

Thus, in the present invention, the player having the memory card device 20 sees the disclosed password, enters this password into his or her memory card device 20, and acquires the specific card depending upon the degree of matching. For example, if all of the lower five digits of the password are matched with the lower five digits of the identification number, then the player acquires a card having a high attack point and/or a high defense point. Upon detection of the match between only the lowest digits of the password and the identification number, then the player acquires a card having a relatively low attack point and a relatively low defense point. With the arrangement that a specific card is obtained if the match is detected between the lowest digits of the identification number and the password as mentioned above, the specific card is obtained by at least one of ten memory card devices 20 assigned with identification numbers in a serial fashion.

By the use of the correspondence between the identification number of the memory card device 20 and the password, the specific cards newly obtained are determined at random for every memory card device 20. Therefore, the cards stored in the memory card device 20 of one player will be different from the cards stored in the memory card device 20 of any other player. Thus, each individual memory card device 20 is given a unique character.

As described above, those new cards can be obtained by entering the password corresponding to the identification data (identification number) of the individual memory card device 20. In other words, the specific cards cannot be obtained unless the identification data corresponds to or matches the password. Such correspondence between the identification data and the password has a stochastic or probabilistic nature and resembles to a lottery. In this connection, the above-mentioned game mode for obtaining the new cards will be referred to as a lottery mode. The lottery mode is realized by operating the memory card device 20 in combination with the game device main unit 10. The overall apparatus, including the memory card device 20 and the game device main unit 10 realizing the lottery mode, constitutes a card game system. In the embodiment described above, the password is subjected to a prescribed operation to be converted into a converted number. Therefore, the player hardly know which card will be obtained and the interest in collection of the cards is enhanced. Alternatively, the password may not be converted into the converted number before comparison between the prescribed digits of the password and the identification data. Further alternatively, not only the password but also the identification data may be converted to carry out comparison between the converted password and the converted identification data.

Figure 6:
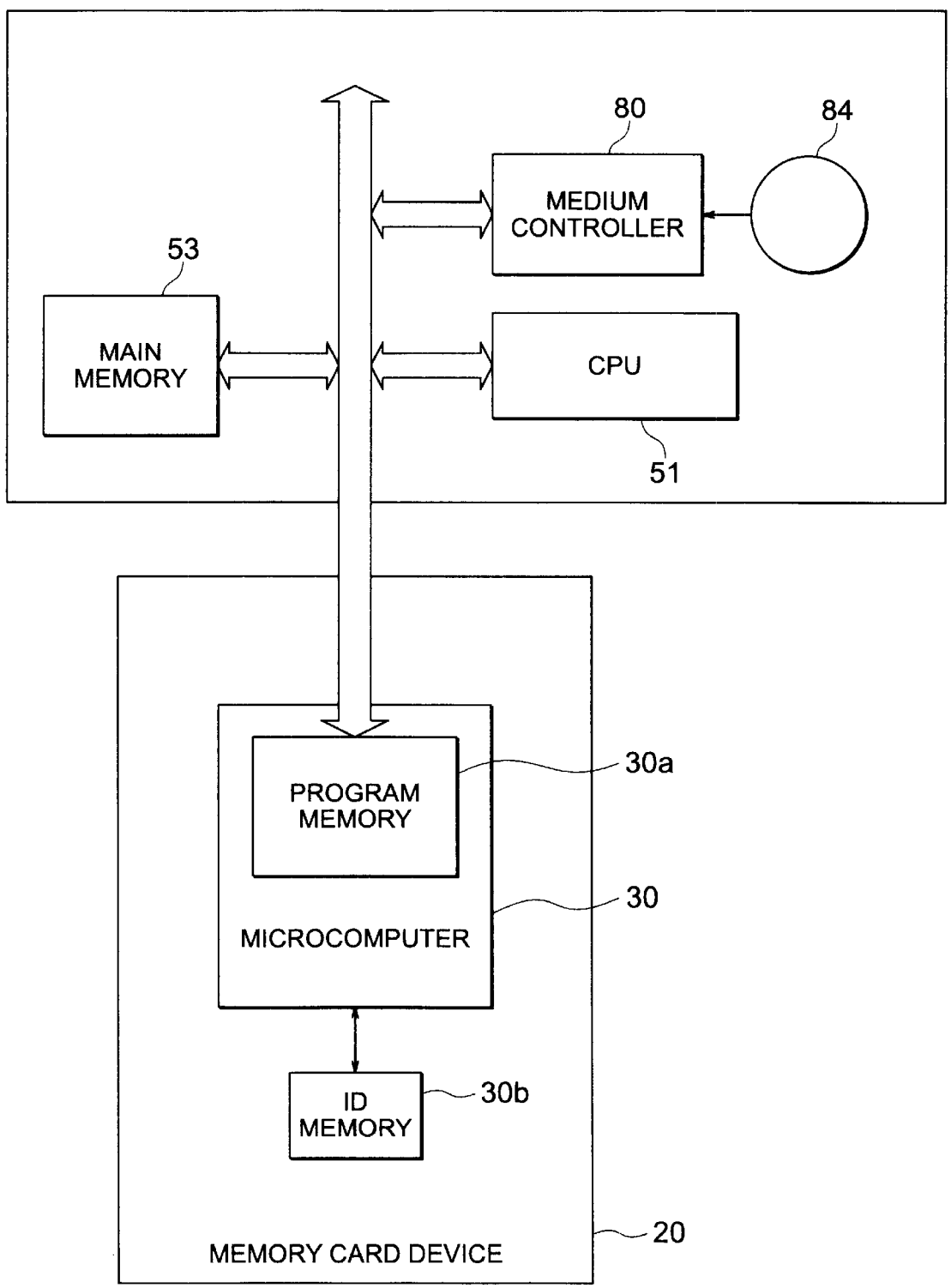
FIG. 6 is a block diagram for describing an operation of downloading a program from a game device main unit to a memory card device, in the game system illustrated in FIG. 1.

Next referring to FIG. 6, the card game system realizing the above-mentioned lottery mode will be described more in detail. In order to achieve the lottery mode, a part of the card game program read from the storage medium 84 loaded in the medium controller 80 of the main unit 10, i.e., a program part containing the lottery mode program must be transmitted via the CPU 51 in the main unit 10 to the memory card device 20 and downloaded into the program memory 30a of the microprocessor 30 in the memory card device 20.

Figure 7:
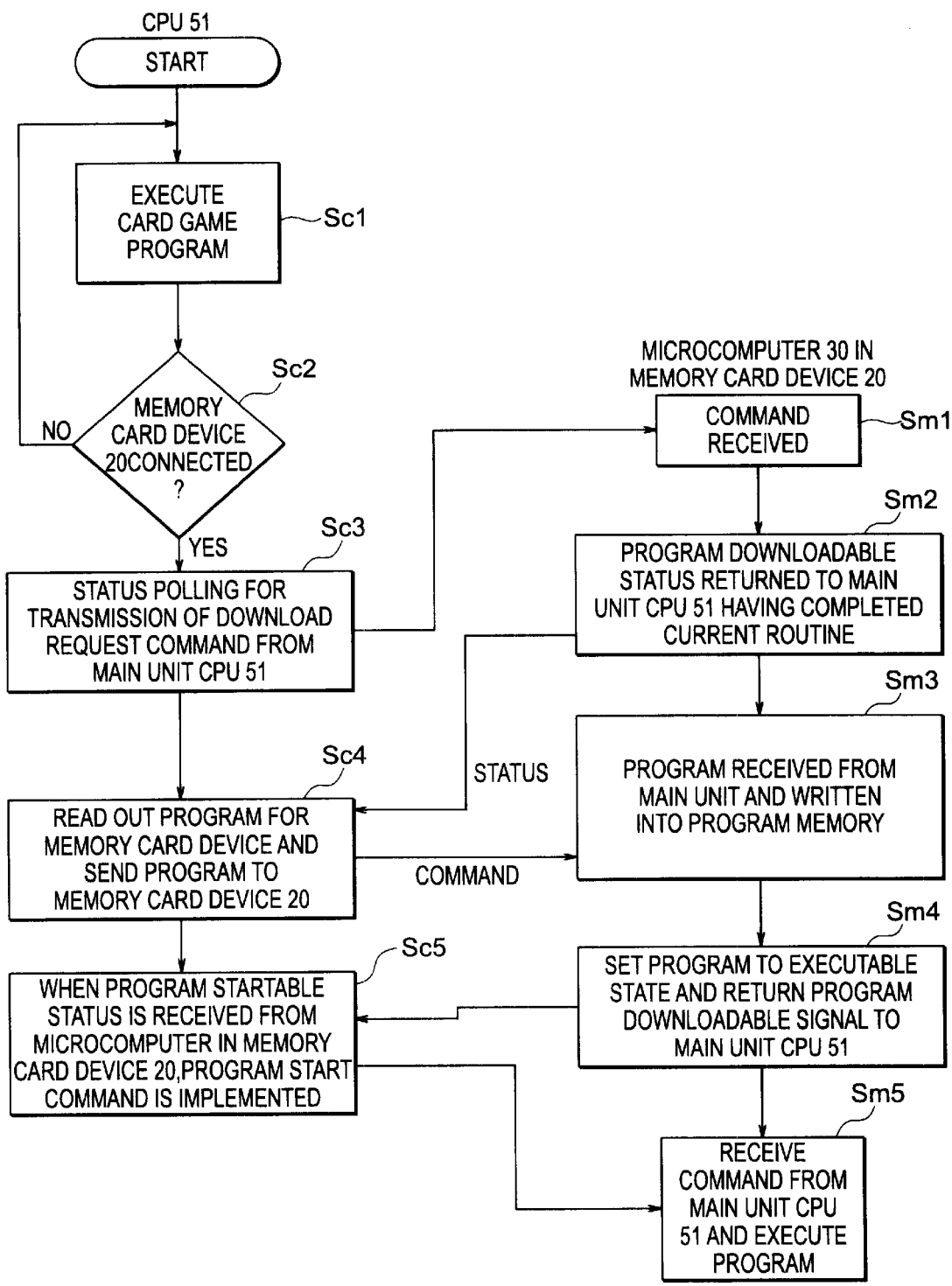
FIG. 7 is a flowchart for describing the download operation in FIG. 6.

Referring to FIG. 7 in addition, description will now be given of operation steps executed by the CPU 51 in the main unit 10 and the microprocessor 30 in the memory card device 20 in order to download the above-mentioned program part into the memory card device 20. It is assumed here that the memory card device 20 is loaded in the main unit 10, as illustrated in FIG. 1. At first, the above-mentioned card game program is being executed in the main unit 10 (step Sc1). Then, judgement is made as to whether or not the memory card device 20 is connected (step Sc2). If the memory card device 20 is not connected (No in step Sc2), then the card game is continuously executed. On the other hand, if the memory card device 20 is connected (Yes in step Sc2), then the operation proceeds to a step Sc3.

In the step Sc3, the CPU 51 in the main unit 10 transmits a program download request instruction to the microcomputer 30 in the memory card device 20 and then carries out a polling operation to receive a response from the microcomputer 30.

The microcomputer 30 of the memory card device 20 receives the above-mentioned download request instruction (step Sm1). Then, a current routine being executed by the microcomputer 30 is terminated and a program downloadable status indicating that the microcomputer 30 is ready to receive a program to be downloaded is returned to the CPU 51 in the main unit 10 (step Sm2). Supplied with the downloadable status, the CPU 51 in the main unit 10 reads from the storage medium 84 the program for the memory card device 20, i.e., the program part containing the lottery mode program, and transmits this program part to the memory card device 20 (step Sc4). Thereafter, the CPU 51 is put into a standby state in which the polling operation is carried out to receive a response from the memory card device 20.

The program part read from the storage medium 84 is written into the program memory 30a in the memory card device 20 (step Sm3). When the above-mentioned program part is completely received from the main unit 10, the memory card device 20 is put into a state in which the above-mentioned program part can be executed. In this state, the memory card device 20 transmits to the CPU 51 in the main unit 10 a program startable status indicating that the program can be executed (step Sm4). Herein, the address of the program memory 30a where the program part is written is administrated by the microcomputer 30.

Upon detection of the state in which the program part can be started, the CPU 51 sends a program start command to the microcomputer 30 (step Sc5). Supplied with the program start command, the microcomputer 30 executes the program part after receiving a start instruction from the player (step Sm5). Upon execution of the program part, the memory card device 20 is generally removed from the main unit 10 and serves as a portable game device for executing the above-mentioned program part.

In the foregoing description, the program part for the memory card device, i.e., the lottery mode program is written to the program memory 30a by the main unit 10. Alternatively, the program part may temporarily be stored in the non-volatile memory 32 shown in FIG. 3 and thereafter copied to the program memory 30a.

Figure 8:
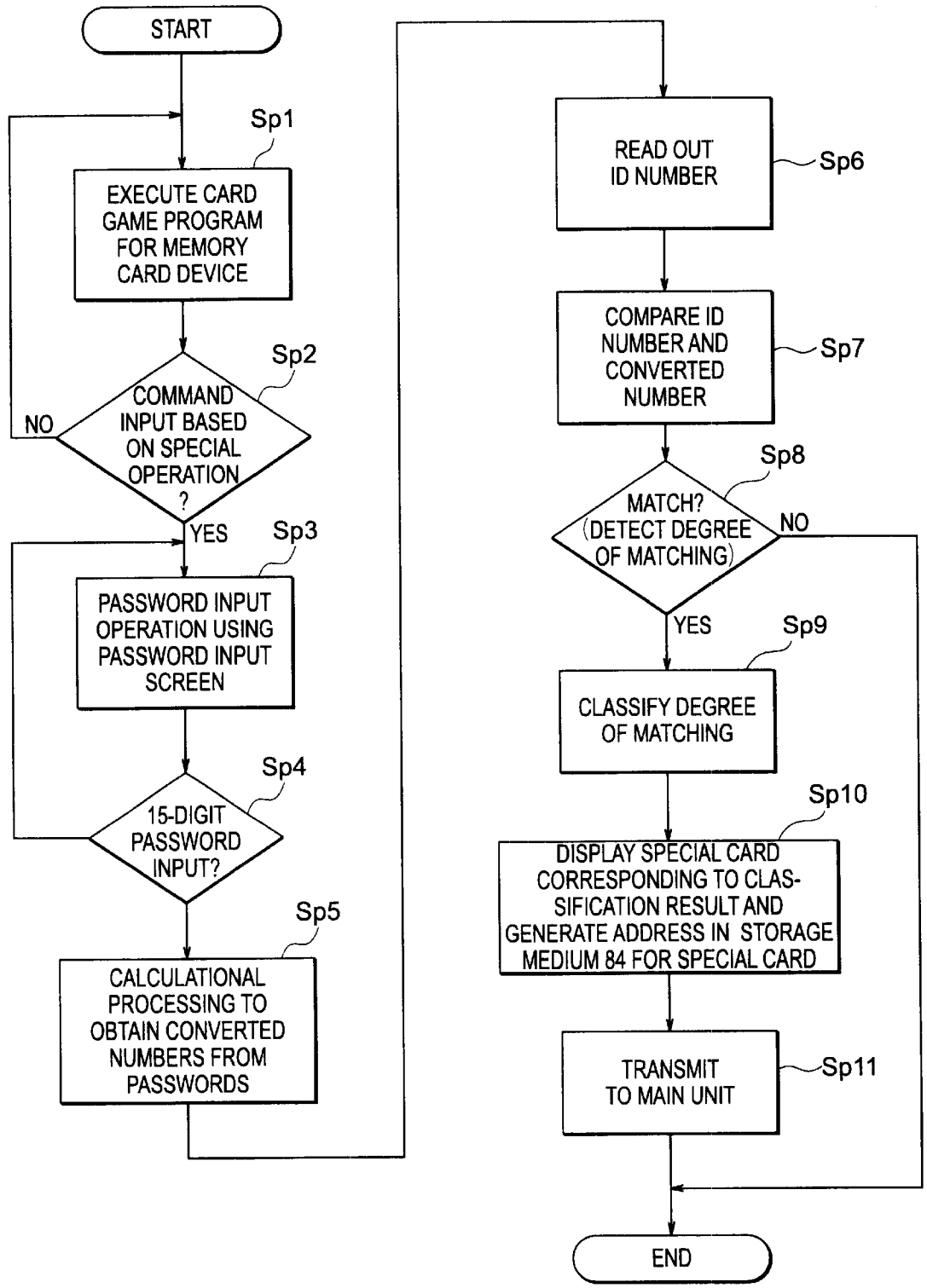
FIG. 8 is a flowchart for describing the operation of the memory card device upon execution of a card game relating to the present invention.
Figure 9:
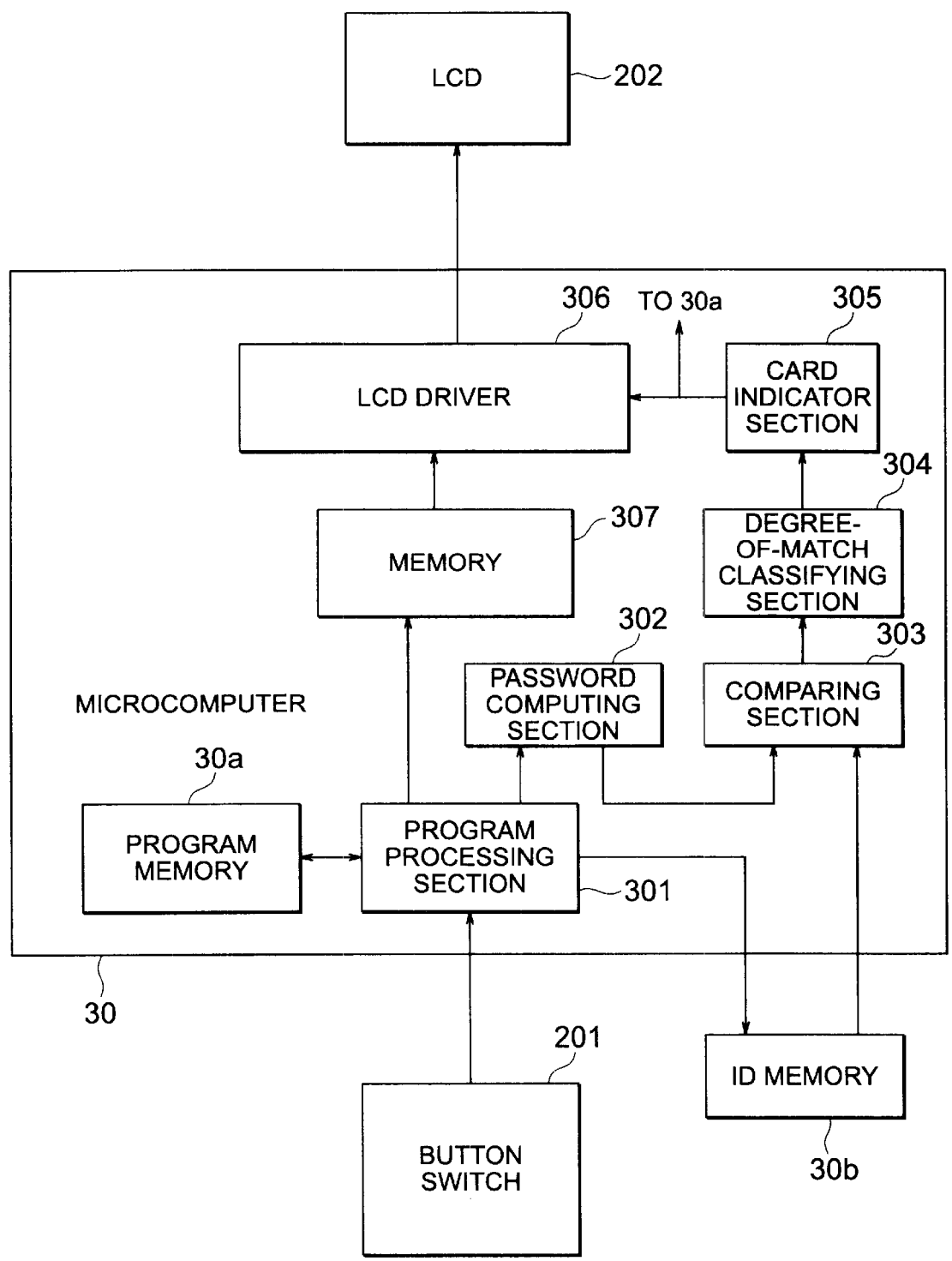
FIG. 9 is a block diagram illustrating a memory card device for executing the operation shown in FIG. 8.

Next referring to FIGS. 8 and 9, description will be made of the operation and the structure of the microcomputer 30 in the memory card device 20, which executes the program part containing the lottery mode program. The player operates the enter button 201b (FIG. 2B) of the button switch 201 provided as input means on the memory card device 20. Then, the memory card device 20 detects the player's operation in a program processing section 301, and starts and executes the memory-card program part downloaded from the main unit 10 (step Sp1). The memory-card program part not only contains the lottery mode program but also other programs, for example, a communication program for performing communication by the use of the memory card device 20. However, the other programs except the lottery mode program have no direct concern with the present invention and will not be described here. At any rate, the program is written into the program memory 30 under control of the program processing section 301 and is thereafter executed by the program processing section 301. The results of execution are successively displayed on the liquid crystal display 202.

It is supposed here that a campaign mode of the program part is executed and the player has cleared the campaign mode. In this state, the player operates the up/down/left/right key 201a (FIG. 2B) in a predetermined order, in other words, performs a specific input operation, to enter a secret command. At this time, the microcomputer 30 in the memory card device 20 judges that the specific input operation is the secret command (Yes in step Sp2). Execution of the card game program in step Sp1 will be continued as far as the specific input operation is not performed (No in step Sp2). In the example being illustrated, it is supposed that, in the step Sp1, a menu screen is displayed and a selected program is executed in accordance with the selection and the determination by the player.

As a result of the specific input operation by the player, it is judged in the step Sp2 that the secret command has been entered. Then, the microcomputer 30 in the memory card device 20 makes the liquid crystal display 202 (FIG. 3) display a password display screen IMP (FIG. 2B) (step Sp3). On the password display screen IMP, it is possible to enter a 15-digit number representing the password in three rows each containing five digits. In FIG. 2B, the cursor can be moved to each digit by operating the left and the right buttons of the up/down/right/left key 201a. A numeral is given to each digit by the use of the up and the down buttons. Then, the numerals at these digits are entered by the use of the enter button 201b.

Unless all of the 15 digits are supplied with numerals, the step Sp3 is continued. When the numerals are given to all of the 15 digits (Yes in step Sp4), the program processing section 301 of the microcomputer 30 in the memory card device 20 sends the password to a password computing section 302. The password computing section 302 performs calculational processing upon the numerals of the password (step Sp5). In the step Sp5, the password computing section 302 performs the calculational processing in which, for example, random numbers are generated for the 15-digit password to convert the password into a 5-digit number. Thus, in this example, the 15-digit number constituting the password is converted by the password computing section 302 into the 5-digit number between 0 and 99999.

When the 5-digit number (hereinafter called a converted number) is obtained as a result of the calculational processing carried out by the password computing section 302 in the step Sp5, the program processing section 301 of the microcomputer 30 in the memory card device 20 accesses to the ID memory 30b (FIG. 3) and reads the identification data (in this case, the 5-digit number) allocated to the memory card device 20 (step Sp6).

Then, a comparing section 303 in the microcomputer 30 compares the converted number obtained in the step Sp5 with the identification data read in the step Sp6 (step Sp7), and judges whether or not these numbers are matched with each other (step Sp8). In the step Sp8, judgement is made as to whether or not the lowest digits of these numbers are matched with each other. Upon detection of the non-match, the lottery mode is terminated. Upon detection of the match, judgement is made as to whether or not the second lowest digits are matched with each other. If the second lowest digits are not matched with each other, then the lowest digits of these numbers alone are matched. If the second lowest digits are matched also, then the the lower two digits of these numbers are matched. If the match is detected between the second lowest digits of these numbers, judgement is made as to whether or not the third lowest digits are matched with each other. Likewise, judgement is made as to the match or the non-match between these numbers to the fifth lowest digits.

In the above-mentioned manner, the comparing section 303 executing the step Sp8 judges the match or the non-match between these numbers from the lowest digits to the fifth lowest digits to detect the degree of matching corresponding to the number of matching digits. A degree-of-matching classifying section 304 in the microcomputer 30 classifies the degree of matching (step Sp9). A card indicator section 305 generates a card indicator signal indicating a specific card corresponding to the degree of matching. Specifically, the card indicator section 305 produces the card indicator signal to indicate different specific cards corresponding to the different degrees of matching. In other words, the specific card obtained when only the lowest digits of the two numbers are matched is different from the specific card obtained when a greater number of digits of the two numbers are matched.

Specifically, in response to the result of classification in the step Sp9, the card indicator section 305 of the microcomputer 30 drives, via an LCD driver 306, the liquid crystal display device 202 to display the name and the design of the specific card to be obtained, and generates an address for the specific card in the storage medium 84 or an identifier for the specific card (step Sp10). In FIG. 9, the LCD driver 306 is controlled by the program processing section 301 via a memory 307. Furthermore, the address or the identifier for the specific card generated in the step Sp10 is stored in the non-volatile memory 32 or the program memory 30a of the memory card device 20.

When the memory card device 20 is mounted onto the main device 10, the address or the identifier for the specific card is transmitted from the microcomputer 30 to the CPU 51 in the main device 10 (step Sp11) and the lottery mode in the memory card device 20 is terminated.

Supplied with the address or the identifier for the specific card, the CPU 51 in the main unit 10 is allowed to access to the address or the region of the storage medium 84 which is allocated to the specific card in consideration. As a result, the specific card can be displayed on the display device when the card game is played. This means that the specific card obtained in the lottery mode in the memory card device 20 can be used in the card game.

As will be understood from the foregoing, the lottery mode program downloaded to the memory card device 20 is arranged so that, upon detection of the particular input signal, the specific card determined by the relationship between the input signal and the identification data is generated. In other words, the program memory 30a in the memory card device 20 serves as storage means for storing the above-mentioned lottery mode program.

In the foregoing, description is directed to the case where, in the game system comprising the game device main unit for executing the card game and the memory card device, the specific card is generated by converting the password represented by the input signal into the converted code and compares the converted code with the identification data. However, the present invention is not limited to the above. For example, comparison may be made between the prescribed digits of the password and the identification data. Moreover, the foregoing description is directed to the case where the random number corresponding to the password is generated. However, a variety of functions may be used for conversion of the password. Furthermore, not the password but the identification data may be converted and compared. It is also possible to convert both the password and the identification data and to compare the converted password and the converted identification data.

Furthermore, a plurality of passwords corresponding to the individual identification data may be preliminarily stored in a table in the form of a list. Then, comparison is made between the input password entered as the input signal and the stored password read from the table. If the input password matches the stored password, a new card is generated. In this case, it is necessary to set the passwords corresponding to the individual identification data in the table in the memory card device 20 and to provide a memory for storing these passwords. If the above-mentioned approach in which the passwords are stored in the table is adopted, it is possible to increase the probability of generation of the specific card by comparing only a predetermined number of digits among the 15 digits and generating the specific card if these digits are matching.

The present invention is not limited to the game device, the game system, and the storage medium storing the program used therein but is applicable to other electronic processing apparatuses (for example, CPU) assigned with the identification data to generate inherent events depending upon the identification data of the individual electronic processing apparatus in the lottery manner, in other words, in a stochastic or probabilistic manner.

In the present invention, the game is executed utilizing the identification data individually assigned to the electronic processing devices, such as a memory card device, for electronic processing. It is therefore possible to impart unique characteristics to the individual electronic processing devices by generating the events depending upon the identification data. Moreover, if the present invention is applied to the memory card device having the identification data, various items, such as the cards, may be prepared in dependence upon the identification data so that the game can be enjoyed by the use of the cards corresponding to the individual memory card devices. Furthermore, in case where the present invention is applied to the card game, the password may be disclosed in magazines or the like. Then, comparison or collation is made between the disclosed password and the identification data specific to the individual memory card devices to obtain the specific card in accordance with the result of comparison. Thus, the game using the specific card can be freshly enjoyed to thereby prolong the player's interest.

What is claimed is:

1. A game device for implementing a game in accordance with a predetermined program, said game device being provided with input means for inputting input signals while identification data is inherently assigned to each individual game device, said game device comprising:
   identification data storage means for storing said identification data; and
   input signal processing means, responsive to the input signal given from said input means and to the identification data, for processing the input signal and the identification data to detect a degree of a matching relationship between the input signal and the identification data and to generate at least one of an event and an item determined by the matching relationship between said input signal and said identification data by the use of said inherent identification data.

2. The game device according to claim 1, wherein said input signal processing means comprises:
   judging means, responsive to said input signal, for judging whether or not the matching relationship between said input signal and said identification data has a predetermined relationship after said identification data is read out of the identification data storage means; and
   generating means for generating said at least one of the event and the item, when the matching relationship between said input signal and said identification data has the predetermined relationship.

3. The game device according to claim 2, wherein said judging means comprises comparing and detecting means for comparing said input signal with said identification data to detect a match or a non-match therebetween as said predetermined relationship, and means for driving said generating means on detection of the match.

4. The game device according to claim 3, wherein said judging means comprises converting means for carrying out conversion of at least one of said input signal and said identification data.

5. The game device according to claim 4, wherein said judging means converts both said input signal and said identification data into converted signals of a prescribed format and said comparing and detecting means compares a match or a non-match between said converted signals.

6. The game device according to claim 4, wherein said judging means converts said input signal into a converted signal of a prescribed format, and said comparing and detecting means compares a match or a non-match between said converted input signal and said identification data.

7. The game device according to claim 6, wherein said converted signal obtained by converting said input signal represents a symbol sequence consisting of a plurality of symbols;
   said identification data also representing a symbol sequence consisting of a plurality of symbols;
   said comparing and detecting means comprising means for indicating a degree of matching representative ones of the number of symbols between the two symbol sequences;
   said driving means sending different output signals to said generating means on the basis of said degree of matching while said generating means generates mutually different events and items determined by said different output signals.

8. The game device according to claim 7, wherein the symbol sequences represented by said converted signals and said identification data are represented by number series composed of a plurality of digits, said comparing and detecting means detecting whether or not these numbers are identical with each other by successively comparing these numbers with each other in a sequential order from the lowest digit, said degree of matching being indicated in accordance with the number of matching digits in the two number series.

9. The game device according to claim 2, wherein said judging means comprises comparing means for comparing directly whether or not the relationship between said input signal and said identification data is identical with the predetermined relationship to produce the results of said comparison.

10. The game device according to claim 1, wherein said predetermined program is a program for executing a card game.

11. The game device according to claim 1, wherein said input signal processing means designates specific cards as at least one of the event and the item.

12. A game system comprising a game device main unit for executing a game in accordance with a predetermined program, when a storage medium storing a predetermined program is mounted onto the game device main unit, and a memory card device for carrying out communication with said game device main unit, each memory card device being assigned with an identification code which differs from that of any other memory card device, as identification data, wherein said memory card device comprises:
   a program memory for storing a program section which forms a part of the predetermined program and which is accessible to the identification data;
   password input means for inputting a password as an input signal to said memory card device; and
   detecting means for stochastically detecting a matching relationship between said input signal and said identification data, under the control of said program section, to reflect the results of said detection step in said game which is being executed by said game device main unit.

13. The game system according to claim 12, wherein the game executed by said predetermined program is specified by a card game which determines a predetermined number of cards usable in said game device main unit alone;
   said cards usable in said card game being changed in number from the predetermined number to another in accordance with the detection results of said detecting means in said memory card device.

14. The game system according to claim 12, wherein said detecting means in said memory card device comprises determining means for determining whether or not the relationship between said input signal and said identification data satisfies a prescribed relationship and designating means responsive to the results of said determining step, for designating specific cards which are useable in said card game.

15. The game system according to claim 14, wherein said specific cards is not included in the cards which are usable in said game device main unit.

16. The game system according to claim 14, wherein said determining means comprises:

comparing and detecting means for detecting a match between said input signal and said identification data as said prescribed relationship, after at least one of said input signal and said identification data is converted to a converted signal of a prescribed format; and driving means for driving said designating means on detection of said match.

17. The game system according to claim 16, wherein said converted signal is generated by converting said input signal and is constituted by a symbol sequence consisting of a plurality of symbols while said identification data is constituted by a symbol sequence consisting of a plurality of symbols, said comparing and detecting means comprising:

means for indicating a degree of matching in accordance with the number of matching symbols in said two symbol sequences;

said driving means sending different output signals to said designating means in accordance with said degree of matching while said designating means is operable in response to the output signal and generates a signal indicative of specific cards which are determined by the output signal and which are different from one another.

18. The game system according to claim 17, wherein the symbol sequences of said converted signal and said identification data are specified by number series composed of a plurality of digits;

said comparing and detecting means detecting in a sequential fashion from the digit of the lowest order whether or not both the number series are matched with each other, to indicate said degree of matching in accordance with the number of matching digits in said number series.

19. A computer-readable storage medium which stores a card game program and which is for use in a game device comprising input means for inputting input signals and means for storing identification data, wherein said program comprises the steps of:

detecting that a specific input signal is input from said input means;

stochastically processing the specific input signal and the identification data to detect a matching relationship therebetween; and generating specific cards determined by the matching relationship between said input signal and said identification data.

20. The storage medium according to claim 19, wherein said card generating step comprises the steps of:

receiving said input signal and reading out said identification data;

determining whether or not the relationship between said input signal and said identification data satisfies a predetermined relationship; and generating a card in accordance with said predetermined relationship, when the predetermined relationship is satisfied between said input signal and said identification data.

21. An electronic processing device for use in executing electronic processing according to a program, said electronic processing device having inherent identification data assigned individually to each such electronic processing device, wherein said inherent identification data is accessed by said program in response to an input signal and a matching relationship between said input signal and said identification data is stochastically processed to generate, in a lottery style, events peculiar to the electronic processing device and to produce an item dependent on the identification data.

22. The electronic processing device according to claim 21, wherein said electronic processing device is a video game device operated in accordance with the program for executing a prescribed game, and items obtained in relation to said identification data are generated in said prescribed game, as said events of the lottery style inherent to said electronic processing device.

23. The electronic processing device according to claim 22, wherein said prescribed game is a card game, and said items are specific cards determined in accordance with said identification data and said input signal.

24. An image display method used in a system comprising a main device having a display device for displaying images, input means for inputting input signals, display means for displaying said input signals, and a subsidiary device capable of communicating with said main device, said subsidiary device having identification data assigned individually thereto, wherein said subsidiary device performs a step of stochastically comparing said input signal with said identification data so as to detect a matching relationship representative of a degree of matching between the input signal and the identification data, and a step of instructing that a prescribed image corresponding to the degree of matching is displayed by said display means; and said main device implementing a step of displaying said particular image on the display device of said main device in accordance with the instruction from said subsidiary device, so as to display said prescribed image which cannot be displayed by means of said main device alone.

25. The image display method according to claim 24, wherein said main device is the main unit of the game device and said subsidiary device is a memory card device which can be mounted on said game device.

* * * * *